United States Patent [19]

vom Braucke et al.

[11] Patent Number: 4,678,043

[45] Date of Patent: Jul. 7, 1987

[54] HAND TOOL FOR LOOSENING SOIL

[75] Inventors: Hans vom Braucke, Vlotho; Manfred vom Braucke; Dieter Westerwelle, both of Bielefeld, all of Fed. Rep. of Germany

[73] Assignee: Bielefelder Kuchenmaschinen-und Transportgeratefabrik vom Braucke GmbH, Bielefeld, Fed. Rep. of Germany

[21] Appl. No.: 690,765

[22] Filed: Jan. 11, 1985

[30] Foreign Application Priority Data

Jan. 13, 1984 [DE] Fed. Rep. of Germany ....... 3401000
Sep. 28, 1984 [DE] Fed. Rep. of Germany ....... 3435601

[51] Int. Cl.⁴ ........................... A01B 1/06; A01B 1/20
[52] U.S. Cl. .................................... 172/349; 172/372; 172/375
[58] Field of Search ............... 172/156, 157, 182, 183, 172/349, 350, 372, 510, 517, 547, 560, 749, 750, 375

[56] References Cited

U.S. PATENT DOCUMENTS

| D. 273,656 | 5/1984 | Dellinger | D8/8 |
|---|---|---|---|
| 388,428 | 8/1888 | McCormick | 172/183 |
| 1,630,415 | 5/1927 | Blume et al. | 172/510 |
| 2,022,335 | 11/1935 | Bernthal | 172/547 |
| 2,048,201 | 7/1936 | Short | 172/350 |
| 3,430,704 | 3/1969 | Alosi | 172/372 |
| 3,797,581 | 3/1974 | Holloway | 172/372 |
| 4,289,344 | 9/1981 | Mitchell | 172/372 X |
| 4,424,869 | 1/1984 | vom Braucke et al. | 172/349 |

FOREIGN PATENT DOCUMENTS 591345  8/1947  United Kingdom ................ 172/182

*Primary Examiner*—Richard T. Stouffer
*Attorney, Agent, or Firm*—Amster, Rothstein & Ebenstein

[57] ABSTRACT

A hand tool for loosening, cutting and crumbling soil or the like, including a central bearing axle of an angular cross section, a plurality of pairs of pronged wheel arrangements having radially extending prongs and being freely rotatably mounted on the axle such that vertical central planes of the pronged wheels extending in the direction of extension of the radial prongs intersect one another at an acute angle, and wherein the edges of every two adjacent crosswisely interengaging pronged wheels slide along one another to form cutting regions; wherein a spade-type tine or prong formed with an end portion which protrudes beyond the radially extending prongs of the pronged wheels is disposed between every two pairs of intersecting pronged wheels. The spade-type prong is mounted on the axle which may be angularly orientated, as desired, by adjusting the inclination of the handle, such as a shaft non-rotatably mounted on the axle.

15 Claims, 15 Drawing Figures

U.S. Patent   Jul. 7, 1987   Sheet 1 of 4   4,678,043
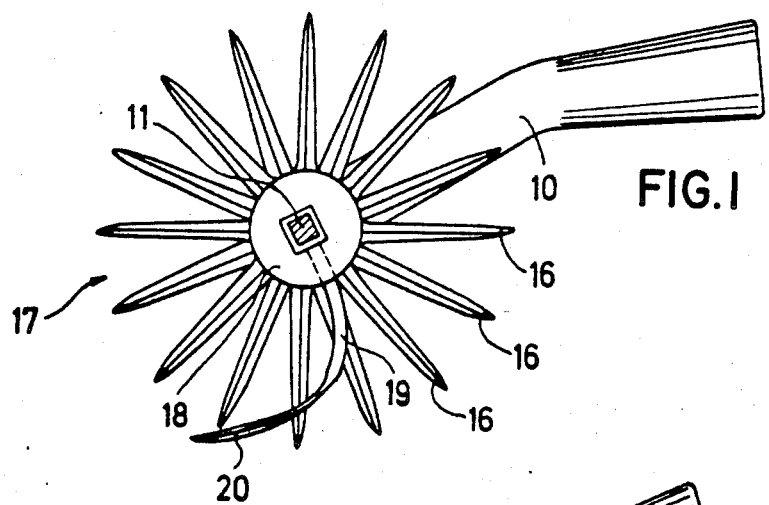
FIG.1
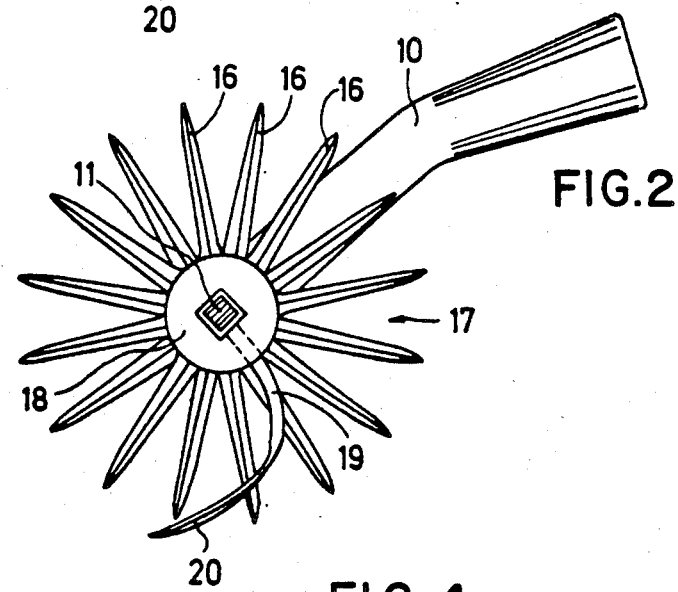
FIG.2
FIG.3   FIG.4   FIG.5
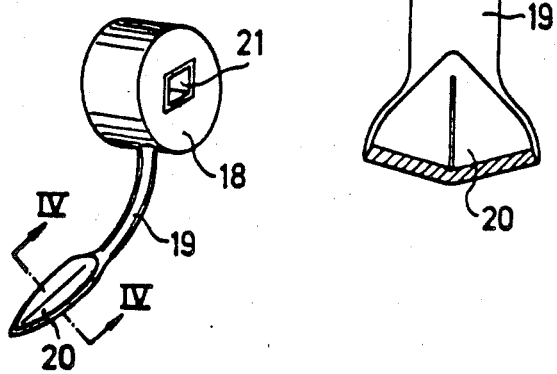

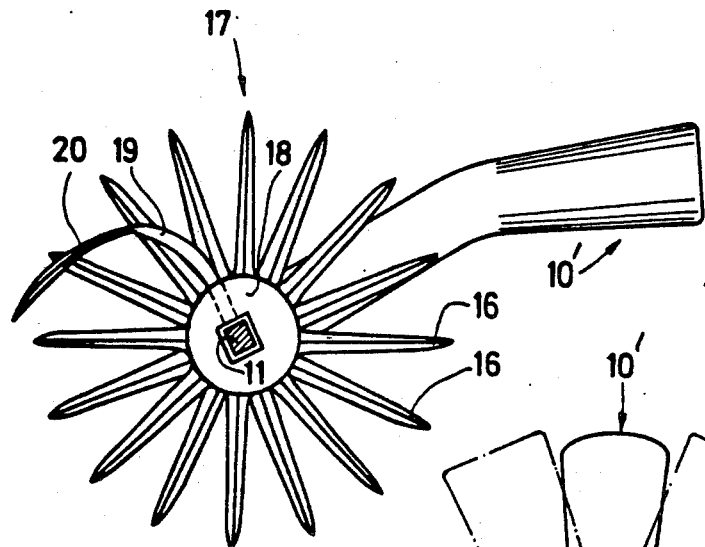
FIG. 9
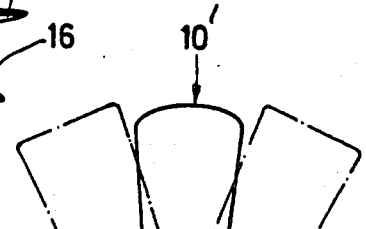
FIG. 10
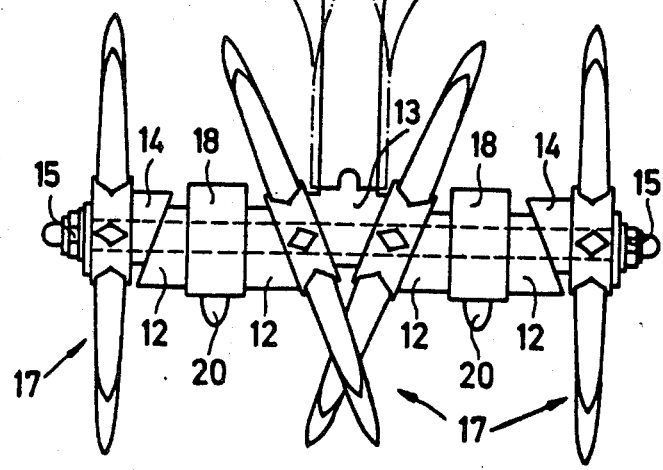

HAND TOOL FOR LOOSENING SOIL

The present invention relates to a manually operable device or hand tool for loosening, cutting and crumbling garden soil or the like, including pronged wheel arrangements each having prongs in star-like arrangement and with said wheel arrangements being mounted to be freely rotatably secured on bearing sleeves, the axles of which pronged wheel arrangements face one another to form V-like arrangements. The star prongs of these pronged wheels have vertical central planes extending in the direction of the radial star prongs and the planes intersect one another at an acute angle. The edges of every two adjacent crosswisely interengaging pronged wheels whose prongs slide along one another form cutting locations. Intermediate guide bearings are disposed between the bearing sleeves and are mounted with the bearing sleeves on a horizontal, central axle so as to be nonrotatable and displaceable in the longitudinal direction of the axle.

U.S. Pat. No. 4,424,869 discloses a manually operable tool of this type. It permits the soil to be loosened by the breaking-up of clods, whereby the rotatably mounted pronged wheels, which are supported by the horizontal axle supported and guided by a handle or shaft, penetrate the soil with their star prongs and, already in the soil, cut-up the clods with their cutting portions depending on the inclination of the shaft.

The invention seeks to improve a manually operable tool of this type so that even the soil located between a pair of intersecting pronged wheels can be conveyed to the cutting region of the pronged wheels and can thus be loosened.

According to the invention, this object is achieved, in that a coaxial bearing sleeve is mounted on the central axle between every two pairs of intersecting pronged wheels, a scooptype, bucket-type or blade-type prong being rigidly secured to said bearing sleeve and terminating in a blade or scoop.

As the blades of the blade-type prongs travel over an area of soil, they penetrate the soil and cut open the compacted upper layer, thereby causing furrows to be formed and causing the soil of the furrows to be conveyed to the adjacent pairs of pronged wheels.

The cross-section of the central axle is preferably angular and preferably square, and the bearing sleeves of the pronged wheels, the bearing sleeve of each blade-type prong and the intermediate guide bearings are all provided with a central, angular and preferably square through-aperture which has a cross-section corresponding to that of the axle. This arrangement prevents the bearing sleeves and the intermediate guide bearings from rotating about the central axle. When the push-shaft of the hand tool pivots, therefore, the bearing sleeve also have to pivot therewith. In consequence, it is possible to selectively change the depth of penetration of the blades and of the blade-type prongs which are secured to the bearing sleeves. This is especially advantageous when the blades encounter tree or other roots in the soil and such roots should not be destroyed or damaged. The blades are then raised out of the soil by means of the flatter disposition of the shaft.

Preferred embodiments of the invention are contained in the claims. The scope of protection extends not only to the individual features claimed, but also to combinations of such features.

Embodiments of the invention are illustrated by way of example in the accompanying drawings and are described more fully hereinafter. In the drawings:

FIG. 1 is a side view of a hand tool with the handle means or shaft for displacement being in a generally flat position, a coaxial bearing sleeve of a blade-type prong being illustrated;

FIG. 2 illustrates the hand tool of FIG. 1 with the shaft disposed in a steeper inclination to the horizontal;

FIG. 3 is a perspective view of a coaxial bearing sleeve provided with a blade-type prong and a blade;

FIG. 4 is an enlarged, sectional view taken along the line IV—IV of FIG. 3;

FIG. 5 is a front view of a coaxial bearing sleeve having secured thereto two identical blade-type prongs provided with end blades;

FIG. 9 is a side view of the hand tool having an axle adjustable through 180° on the handle connecting member;

FIG. 10 is a plan view of the hand tool with indications in broken lines of two positions of the connecting member after its rotation through 90°;

Figure 6:
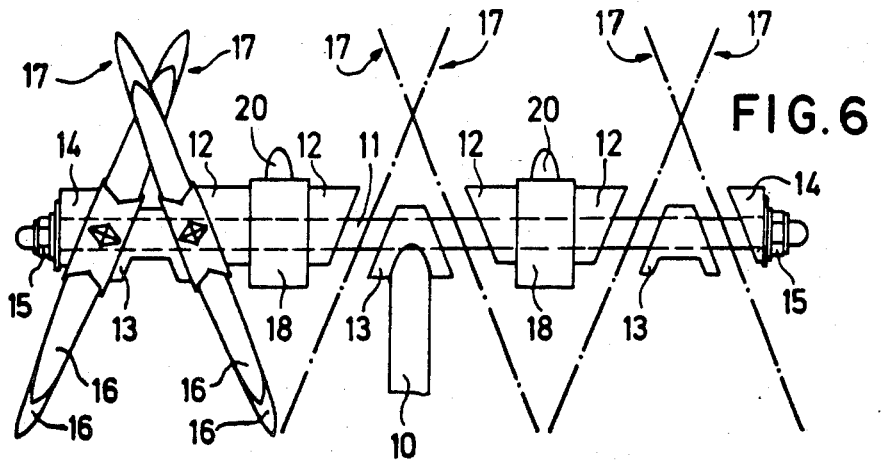
FIG. 6 is a schematic plan view of the inter-relationship between the pronged wheels, bearing sleeves and intermediate guide bearings on the central axle.

A hand tool has a shaft-receiving socket or connecting member 10 connected to a horizontal, central axle 11 which has an angular cross-section, for example, a square cross-section. Bearing sleeves 9, which may be made of hard plastics material, face one another to form a "V" disposition and are arranged in pairs at acute angles, the bearing sleeves 9 being slid onto the central axle 11. In addition, intermediate guide bearings 12 and 13 which may also be made of hard plastics material are mounted between the bearing sleeves 9. End bearings 14 are disposed on the ends of the central axle 11 and correspond in part to the intermediate guide bearings 12 and 13, the outer faces 14a of the end bearings 14 being disposed at right angles to the axle 11 and serving as stop faces for end nuts 15 screwed onto the ends of the axle 11.

A pronged wheel arrangement 17 is provided with a plurality of radially protruding prongs 16 in star-like arrangement and is mounted on each bearing sleeve 9 in such a manner that it can freely rotate about its axle. In such a case, every two adjacent pronged wheels 17 form a pair of intersecting pronged wheels 17, the vertical central planes of the two adjacent pronged wheels extending in the direction of the radial star prongs 16 and forming an acute angle, i.e. in a V-like arrangement. For this purpose, the end faces of the intermediate guide bearings 12 and 13 must also extend at an appropriate angle to the central axle 11 since the bearing sleeves 9 of the pronged wheels 17 are laterally supported on the intermediate guide bearings 12 and 13.

According to FIG. 6 of the drawing, the inner faces of the end bearings 14 extend at such an angle. In addition, the two end faces of the intermediate guide bearings 13 are angularly disposed between two pronged wheels 17. The member 10 is rigidly secured, for example, by being welded, to one such intermediate guide bearing 13 in the central region of the central axle 11.

A coaxial bearing sleeve 18 is mounted on the central axle 11 between every two pairs of pronged wheels 17, and a spoon-, scoop-, or spade-type tine or prong 19 is rigidly secured, for example, by being welded, to said bearing sleeve 18. The spade-type prongs 19 extend in a curved manner in a plane extending vertically to the horizontal, central axle 11 and terminates at a lower end in a flattened spade end portion 20. In such a case, the end 20 protrudes beyond the outer end region of the star prongs 16 so that, by pivoting the member 10, the central axle 11 which is non-rotatably connected thereto and the coaxial bearing sleeves 18 which are non-rotatably disposed on the axle 11, it is possible to insert the ends 20 of the spade-type prongs 19 into the soil to a greater or lesser depth or, however, to keep the ends 20 out of the soil when the member 10 is set in a flat or horizontal position.

Each intermediate guide bearing 12 is disposed between a pronged wheel 17 and a coaxial bearing sleeve 18 and has one end face which abuts against the bearing sleeve 18 and extends at right angles to the central axle 11, while its other end face, which abuts aginst the pronged wheel 17, also extends at an angle to the central axle 11 in accordance with the angular disposition of the pronged wheel 17. All of the bearing sleeves for the pronged wheels 17, the two end bearings 14, and the intermediate guide bearings 12 and 13 and the coaxial bearing sleeves 18 have through-apertures formed therein, the cross-section of such apertures corresponding to the cross-section of the central axle 11. They are therefore suitably mounted on the central axle 11. Since the cross-section of the central axle 11 is angular, these mentioned components have to pivot likewise when the central axle 11 rotates. Such an angular central aperture 21 in the coaxial bearing sleeve 18 is illustrated in FIG. 3. This central aperture 21 may be provided in the bearing sleeve 18 either concentrically or eccentrically. When the central aperture 21 is eccentrically disposed, the soil penetration effect of the ends 20 can be intensified as a consequence of a pivotal movement of the central axle 11.

Figure 7:
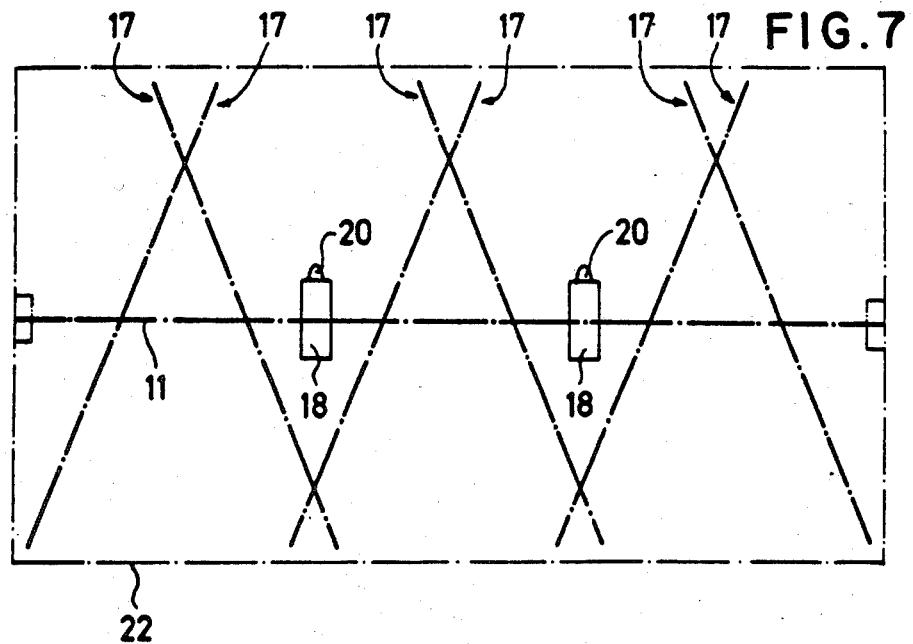
FIG. 7 is a schematic plan view of a tool wherein the adjacent pronged wheels of every two adjacent pairs also intersect one another.

According to FIG. 7 of the drawing, the central axle 11 of the tool is not connected to a shaft, but it is supported by a frame 22, the two ends of the central axle 11 being secured to said frame 22 which surrounds all of the pronged wheels 17. In a similar manner to that of a harrow, this frame 22 can then be drawn horizontally in a direction at right angles to the central axle 11 for soil cultivation purposes. In this embodiment, not only do the two pronged wheels 17 of each pair mesh with each other, but the two adjacent pronged wheels 17 of two adjacent pairs also mesh with each other. From the left-hand end, therefore, not only do the first and second pronged wheels 17 mesh with each other as the third and fourth pronged wheels 17, but the second and third pronged wheels 17 also mesh with each other. In such a case, the coaxial bearing sleeve 18 is provided with the spade-type prong 19 and is disposed between the pair of pronged wheels formed by the first and second pronged wheels 17 and the pair of pronged wheels formed by the third and fourth pronged wheels 17, the ends 20 of said spade-type prong 19 loosening the soil disposed between two pairs and conveying said soil to these pairs.

Figure 8:
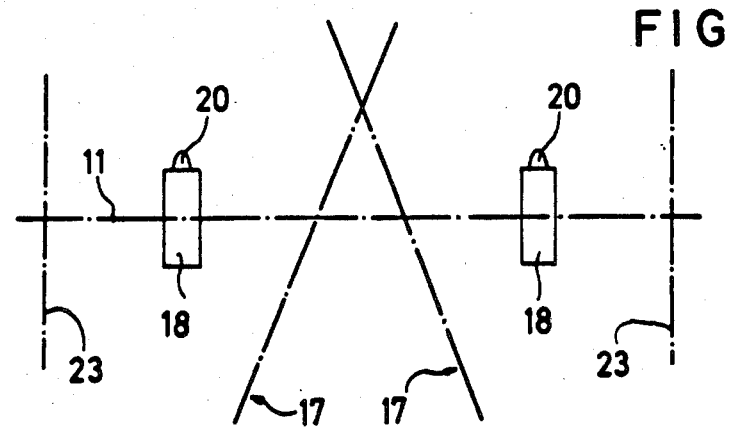
FIG. 8 is a schematic plan view of a tool provided with limiting members which are disposed at right angles on the ends of the axle.
Figure 11:
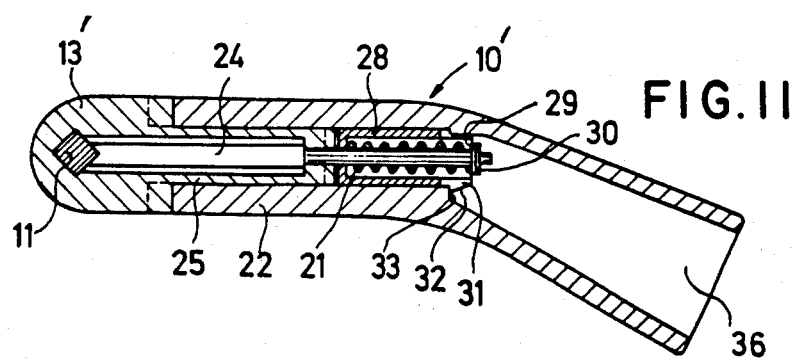
FIG. 11 is a vertical section through the connecting member and its connecting region with the axle.
Figure 12:
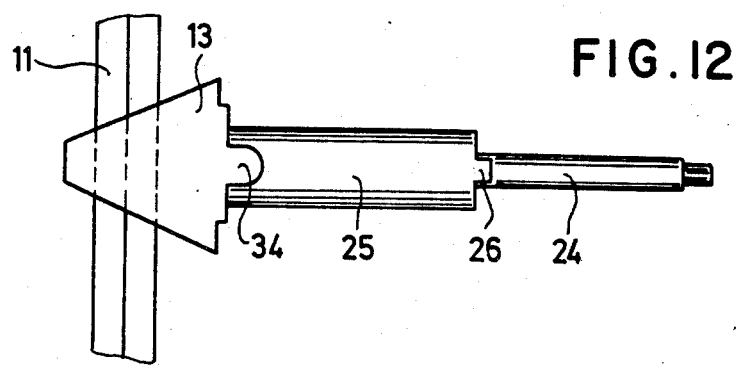
FIG. 12 is a plan view of a bearing pin located on the connecting member and its connecting region with the axle.
Figure 13:
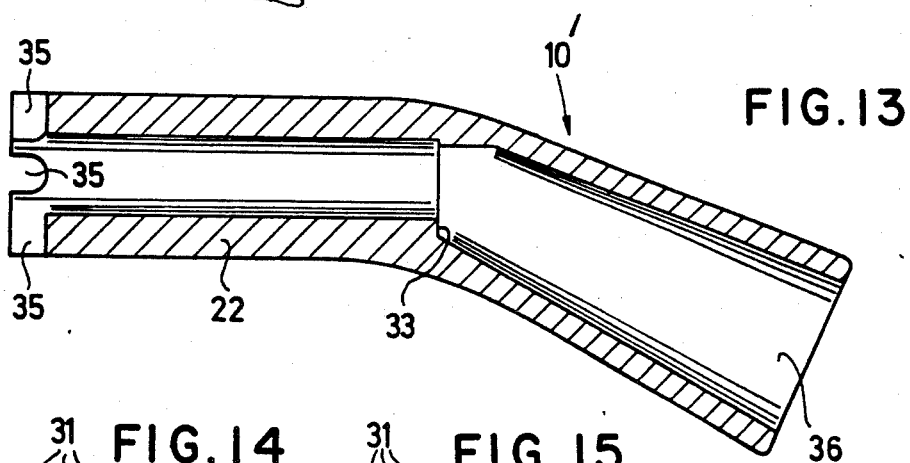
FIG. 13 is a longitudinal section through the shaft of the connecting member.
Figures 14, 15:
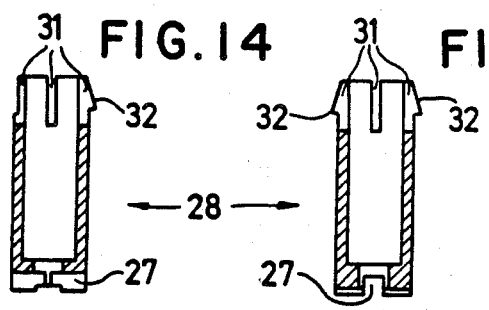
FIG. 14 is a longitudinal section through a receiving sleeve located in the connecting member.
FIG. 15 shows the receiving sleeve in accordance with FIG. 7 in a position rotated through 90°.

According to FIG. 8 of the drawing, a limiting member 23 is disposed at each end of the central axle 11 at right angles to the axle 11 and limits the working width of the tool at the appropriate outer end. Such a limiting member 23 may be a pronged wheel 17, a rotating wheel or a runner.

By means of the ends 20 of the spade-type prongs 19, which may also be termed a coulter in accordance with a plough-share or seed drill, the clods of earth between the pairs of pronged wheels 17 are lifted to a greater or lesser extent, depending on the position of the member 10, and put to one side. This arrangement makes the hand tool especially suitable for hard soil.

In the embodiment of FIGS. 9 to 15 similar parts have similar reference numerals. In order to retain shovel tines or blade-type prongs 19 with scoop-type ends or flattened spade ends 20 in every case during the working out of the soil, the axle 11 carried on the connecting member 10 may be pivoted through 180°, so that the flattened ends 20 no longer project into the soil but in an opposite direction into the air. For this purpose the connecting member 10' accommodates a shaft or shank 22 retained in the engaged position by a compression spring 21 but displaceable against the action of the compression spring, which shaft after displacement may be rotated about its axis.

The connection between the axle 11 and the shank 22 receiving the handle in a conical opening 36 is produced with a bearing pin 24, which is welded at one end to the axle 11 and projects therefrom at right angles from the axle 11. Over a first portion of its length the bearing pin 24 proceeding from the axle 11 is hexagonal and there embedded in or enclosed by a plastics material layer, which partly forms the intermediate guide bearing 13 in the region of the axle 11 and over the remaining partial length of pin 24 forms a sheath or jacket 25 fashioned integrally therewith. On the annular end face of the jacket 25 remote from the axle 11, two first stop projections 26 are formed which are provided for the suitable engagement in first stop grooves 27 of a receiving sleeve 28 for the compression spring 21 located in the shaft 22.

The second portion of the length of the bearing pin 24 not enclosed in the plastics material jacket is located within the receiving sleeve 28 where it is enclosed by the compression spring 21 whereby the latter with the end facing the axle 11 is supported on the inner face of the annular end surface of the receiving sleeve 28. The other end of the compression spring 21 is supported against a bearing disc 29 mounted on bearing pin 24, which disc in turn is retained by a ring 30 secured to the bearing pin 24.

The receiving sleeve 28 at its end remote from the first stop notches 26 has several axial wall slots or slits 31 in the jacket wall. Between the slits 31, the outer surfaces of the jacket wall portions are formed as spring latches or catches 32. In this manner the receiving sleeve 28 may be supported in axial direction on the annular abutment surface 33 within the shank 22. The slits 31 permit the spring catches 32 to execute a resilient movement.

The intermediate guide bearing 13' by way of its defining surface is adapted to the end face of the shaft or shank 22 facing the axle 11. The bearing 13' has projecting second mentioned stop projections 34 which correspond with and fit into corresponding second mentioned stop grooves 35 of the shank 22. All first mentioned stop projections 26 of the jacket 25 with the associated first mentioned stop grooves 27 of the receiving sleeve 28 and all second mentioned stop projections of the intermediate guide bearing 13 with the associated second mentioned stop grooves 35 of the shaft 22 are located mutually offset in peripheral direction through at least 90°. In this manner the connecting member 10' may assume four rotated positions through at least 90° relative to the axle 11.

To adjust the connecting member 10' relative to the axle 11, shank 22 is progressively pulled away from the axle 11, whereby the bearing pins 24 via the abutment surface 33 and the spring catches 32 are relatively displaced in an axial direction. This movement is hence effected against the action of the compression spring 21 in the receiving sleeve 28, so that the compression spring 21 is compressed since its end remote from the axle 11 is retained on the bearing pin 24 by means of the end disc 29 forming a longitudinal bearing with the ring 30. With the axial displacement of shank 22 both the first stop projections 26 and the associated stop grooves 27 of the receiving sleeve 28 and the second stop projections 34 and the associated stop grooves 35 of the shank 22 are disengaged, so that shank 22 is now rotatable about the jacket 25 and about the axis of the bearing pin 24. After a rotation of 90° or 180° respectively, shank 22 is released, so that the compression spring 21 urges it towards the axle 11, whereby corresponding stop grooves and stop projections interengage so that the new position of shank 22 relative to the axle 11 is secured and retained by the compression spring 21.

Although the illustrative embodiments of the invention have been described herein with reference to the accompanying drawings it is to be understood that the invention is not limited to such precise embodiments, and that various changes and modifications may be effected therein by one skilled in the art without departing from the scope or spirit of this invention.

We claim:

1. A hand tool for loosening, cutting and crumbling garden soil or the like, including axle means, connecting means connected to said axle means for premitting displacement of said tool, at least two pronged wheels each of said wheels having radially extending prongs and being freely rotatably mounted on bearing sleeves non-rotatably mounted on said axle means, said pronged wheels having vertical central planes extending in the direction of the radially extending prongs and at least some of the adjacent pronged wheels intersecting each other at an acute angle and wherein at least one spade-type prong is supported on said axle means and terminates in enlarged end means and is disposed along said axle means between every other adjacent pair of said pronged wheels, each said spade-type prong being formed with with said end means protruding outwardly from said axle means beyond the radially extending prongs of the pronged wheels, said bearing sleeves on which said intersecting pronged wheels are mounted facing one another at an acute angle to form V-like arrangements, and intermediate guide bearings are disposed between said bearing sleeves and are mounted together with the bearing sleeves on said axle means so as to be non-rotatable and displaceable in the longitudinal direction of the axle means, each said spade-type prong being rigidly secured to a coaxial bearing sleeve which is non-rotatably mounted on said axle means.

2. The hand tool according to claim 1, wherein the cross-section of said axle means in angular, and the bearing sleeves of the pronged wheels, the bearing sleeve of each said spade-type prong and the intermediate guide bearings are all provided with a central, angular through-aperture which has a cross-section corresponding to that of said axle means.

3. The hand tool according to claim 1, wherein said at least one spade-type prong comprises a plurality of identical spade-type prongs which are disposed spaced apart along the axle means, each said spade-type prong on a coaxial bearing sleeve in a line with the other spade-type prongs.

4. The hand tool according to claim 1, wherein the coaxial bearing sleeve has a central aperture which is eccentrically provided therein of the spade-type prong.

5. The hand tool according to claim 1, wherein an outer one of said pronged wheels is disposed as a limiting member at each end of the axle means at right angles to said axle means and limits the working width.

6. A hand tool according to claim 1, wherein an outer wheel is disposed as a limiting member at each end of the axle means at right angles to said axle means and limits the working width.

7. The hand tool according to claim 1, wherein an outer runner is disposed as a limiting member at each end of the axle means at right angles to said axle means and limits the working width.

8. The hand tool according to claim 1, wherein said intersecting pronged wheel comprise four pronged wheels mounted on the axle means in a line with one another, the first and second pronged wheels intersecting with the third and fourth pronged wheels to form one pair and the second and third pronged wheels also intersecting one another.

9. The hand tool according to claim 1, wherein the ends of the axle means are rigidly secured to a frame which surrounds the pronged wheels, and the central region of said axle means is non-rotatably secured to a shaft through the intermediary of one of said intermediate guide bearings.

10. A hand tool according to claim 1, wherein the connecting means is connected at right angles to the axle means and is adjustable and locatably securable relative thereto in different positions through 90°.

11. A hand tool according to claim 10, wherein the connecting means comprises a shank which encloses a bearing pin rigidly secured to the axle means, which pin over a portion of its length is surrounded by a compression spring urging the connecting means towards the axle means, the compression spring being located in a receiving sleeve with an end face in which the spring is supported at the end face of the sleeve with one end of the spring facing the axle means.

12. A hand tool according to claim 11, wherein the compression spring with its end remote from the axle means is supported against a bearing disc which forms a longitudinal bearing mutually with a ring secured to the bearing pin.

13. A hand tool according to claim 12, wherein the bearing pin between the compression spring and the axle means is enclosed by a cylindrical jacket, on which jacket the shank of the connecting means is mounted, and wherein one of the ends of said pin is non-detachably fixed to the axle means.

14. A hand tool according to claim 13, wherein the receiving sleeve is axially supported at its end remote from the axle means against an annular abutment surface of the shank with spring catches formed thereon and on its annular end face facing the axle means has several first stop grooves offset through 90° in circumferential direction, in which grooves first stop projections of the jacket fittingly engage.

15. A hand tool according to claim 14, wherein the shank at its annular end face facing the axle means has several second stop grooves offset through 90° in which second stop projections of one of said intermediate guide bearings fittingly engage.

* * * * *